United States Patent
Tomlin et al.

(10) Patent No.: US 9,922,667 B2
(45) Date of Patent: Mar. 20, 2018

(54) CONVERSATION, PRESENCE AND CONTEXT DETECTION FOR HOLOGRAM SUPPRESSION

(71) Applicant: Microsoft Technology Licensing, LLC, Redmond, WA (US)

(72) Inventors: Arthur Charles Tomlin, Kirkland, WA (US); Dave Hill, Bellevue, WA (US); Jonathan Paulovich, Redmond, WA (US); Evan Michael Keibler, Bellevue, WA (US); Jason Scott, Redmond, WA (US); Cameron G. Brown, Bellevue, WA (US); Thomas Forsythe, Seattle, WA (US); Jeffrey A. Kohler, Redmond, WA (US); Brian Murphy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/598,578

(22) Filed: Jan. 16, 2015

(65) Prior Publication Data
US 2015/0302869 A1  Oct. 22, 2015

Related U.S. Application Data

(63) Continuation-in-part of application No. 14/255,804, filed on Apr. 17, 2014.

(51) Int. Cl.
*G10L 17/00* (2013.01)
*G10L 25/78* (2013.01)
(Continued)

(52) U.S. Cl.
CPC .............. *G10L 25/78* (2013.01); *G10L 25/48* (2013.01); *G06K 9/00362* (2013.01); *G10L 17/00* (2013.01); *G10L 2021/02166* (2013.01)

(58) Field of Classification Search
USPC .................................. 704/231–257, 270–275
See application file for complete search history.

(56) References Cited

U.S. PATENT DOCUMENTS 6,289,140 B1 * 9/2001 Oliver ..................... G10L 15/30
 382/313
6,370,504 B1 * 4/2002 Zick ....................... G10L 15/142
 704/200.1
(Continued)

FOREIGN PATENT DOCUMENTS

JP   2002-171587 A    6/2002
WO   2007/138503 A1  12/2007
(Continued)

OTHER PUBLICATIONS

Maganti, et al., "Speech Enhancement and Recognition in Meetings with an Audio-Visual Sensor Array", in IEEE Transactions on Audio, Speech, and Language Processing, vol. 15, Issue 8, Nov. 2007, 13 pages.

(Continued)

*Primary Examiner* — Jesse Pullias
(74) *Attorney, Agent, or Firm* — Arent Fox LLP

(57) ABSTRACT

Various embodiments relating to detecting at least one of conversation, the presence and the identity of others during presentation of digital content on a computing device. When another person is detected, one or more actions may be taken with respect to the digital content. For example, the digital content may be minimized, moved, resized or otherwise modified.

10 Claims, 15 Drawing Sheets

(51) Int. Cl.
*G10L 25/48* (2013.01)
*G10L 21/0216* (2013.01)
*G06K 9/00* (2006.01)

(56) References Cited

U.S. PATENT DOCUMENTS

| | | | |
|---|---|---|---|
| 6,931,596 B2 | 8/2005 | Gutta et al. | |
| 7,505,908 B2* | 3/2009 | Johnston | G06F 3/017 |
| | | | 704/270 |
| 7,518,631 B2* | 4/2009 | Hershey | G10L 15/26 |
| | | | 348/14.1 |
| 8,150,688 B2 | 4/2012 | Iwasawa | |
| 9,020,825 B1* | 4/2015 | Garber | G06F 3/167 |
| | | | 704/231 |
| 2001/0029447 A1 | 10/2001 | Brandel et al. | |
| 2002/0116197 A1* | 8/2002 | Erten | G06K 9/6292 |
| | | | 704/273 |
| 2002/0154214 A1* | 10/2002 | Scallie | G02B 27/017 |
| | | | 348/51 |
| 2003/0037243 A1* | 2/2003 | Gruteser | G06F 21/35 |
| | | | 713/185 |
| 2005/0039131 A1* | 2/2005 | Paul | G06F 17/30056 |
| | | | 715/730 |
| 2005/0251386 A1 | 11/2005 | Kuris | |
| 2007/0061851 A1* | 3/2007 | Deshpande | A63F 13/00 |
| | | | 725/88 |
| 2009/0055178 A1 | 2/2009 | Coon | |
| 2009/0313015 A1 | 12/2009 | Basson et al. | |
| 2011/0191109 A1 | 8/2011 | Harma | |
| 2011/0218711 A1 | 9/2011 | Mathur et al. | |
| 2011/0257966 A1 | 10/2011 | Rychlik | |
| 2012/0050143 A1 | 3/2012 | Border et al. | |
| 2012/0060176 A1* | 3/2012 | Chai | H04H 60/45 |
| | | | 725/10 |
| 2012/0128186 A1 | 5/2012 | Endo et al. | |
| 2012/0212414 A1 | 8/2012 | Osterhout et al. | |
| 2012/0212484 A1 | 8/2012 | Haddick et al. | |
| 2012/0235886 A1 | 9/2012 | Border et al. | |
| 2012/0249590 A1 | 10/2012 | Maciocci et al. | |
| 2012/0249741 A1 | 10/2012 | Maciocci et al. | |
| 2012/0253807 A1 | 10/2012 | Kamano | |
| 2013/0185076 A1 | 7/2013 | Yoneyama et al. | |
| 2013/0196757 A1 | 8/2013 | Latta et al. | |
| 2013/0204616 A1 | 8/2013 | Aoki et al. | |
| 2013/0304479 A1 | 11/2013 | Teller et al. | |
| 2013/0335301 A1 | 12/2013 | Wong et al. | |
| 2013/0336629 A1 | 12/2013 | Mulholland et al. | |
| 2013/0342570 A1 | 12/2013 | Kinnebrew et al. | |
| 2014/0081634 A1* | 3/2014 | Forutanpour | G06F 17/289 |
| | | | 704/235 |
| 2014/0172423 A1 | 6/2014 | Dai et al. | |
| 2014/0288939 A1 | 9/2014 | Beaurepaire et al. | |
| 2015/0154960 A1 | 6/2015 | Ai et al. | |

FOREIGN PATENT DOCUMENTS

| | | |
|---|---|---|
| WO | 2013050749 A1 | 4/2013 |
| WO | 2013155217 A1 | 10/2013 |
| WO | 2014011266 A2 | 1/2014 |

OTHER PUBLICATIONS

Choi, et al., "Probabilistic Speaker Localization in Noisy Environments by Audio-Visual Integration", In Proceedings of International Conference on Intelligent Robots and Systems, Oct. 9, 2006, 6 pages.

U.S. Appl. No. 14/255,804, filed Apr. 17, 2014.

PCT Demand and Response to Written Opinion filed Oct. 14, 2015 in PCT Patent Application No. PCT/US2015/024592, 16 pages.

"International Search Report & Written Opinion Received for PCT Patent Application No. PCT/US2015/024592", Mailed Date: Jul. 8, 2015, 13 Pages.

Neumann, et al., "A Verbal Interaction Measure Using Acoustic Signal Correlation for Dyadic Cooperation Support", In Ambient Intelligence—Software and Applications, vol. 219, Jan. 1, 2013, pp. 71-78.

"Second Written Opinion Issued in PCT Application No. PCT/US2015/024592", Mailed Date: Apr. 4, 2016, 5 Pages.

Office Action dated Jun. 30, 2016 in U.S. Appl. No. 14/255,804, 44 pages.

Response to Office Action filed Sep. 29, 2016 in U.S. Appl. No. 14/255,804, 18 pages.

International Preliminary Report on Patentability Issued in PCT Application No. PCT/US2015/024592, Mailed Date: Jul. 6, 2016, 8 Pages.

Final Office Action dated Jan. 19, 2017 in U.S. Appl. No. 14/255,804, 28 pages.

Response to Office Action dated Apr. 19, 2017 in U.S. Appl. No. 14/255,804, 10 pages.

Office Action dated Jul. 26, 2017 in U.S. Appl. No. 14/255,804, 22 pages.

* cited by examiner

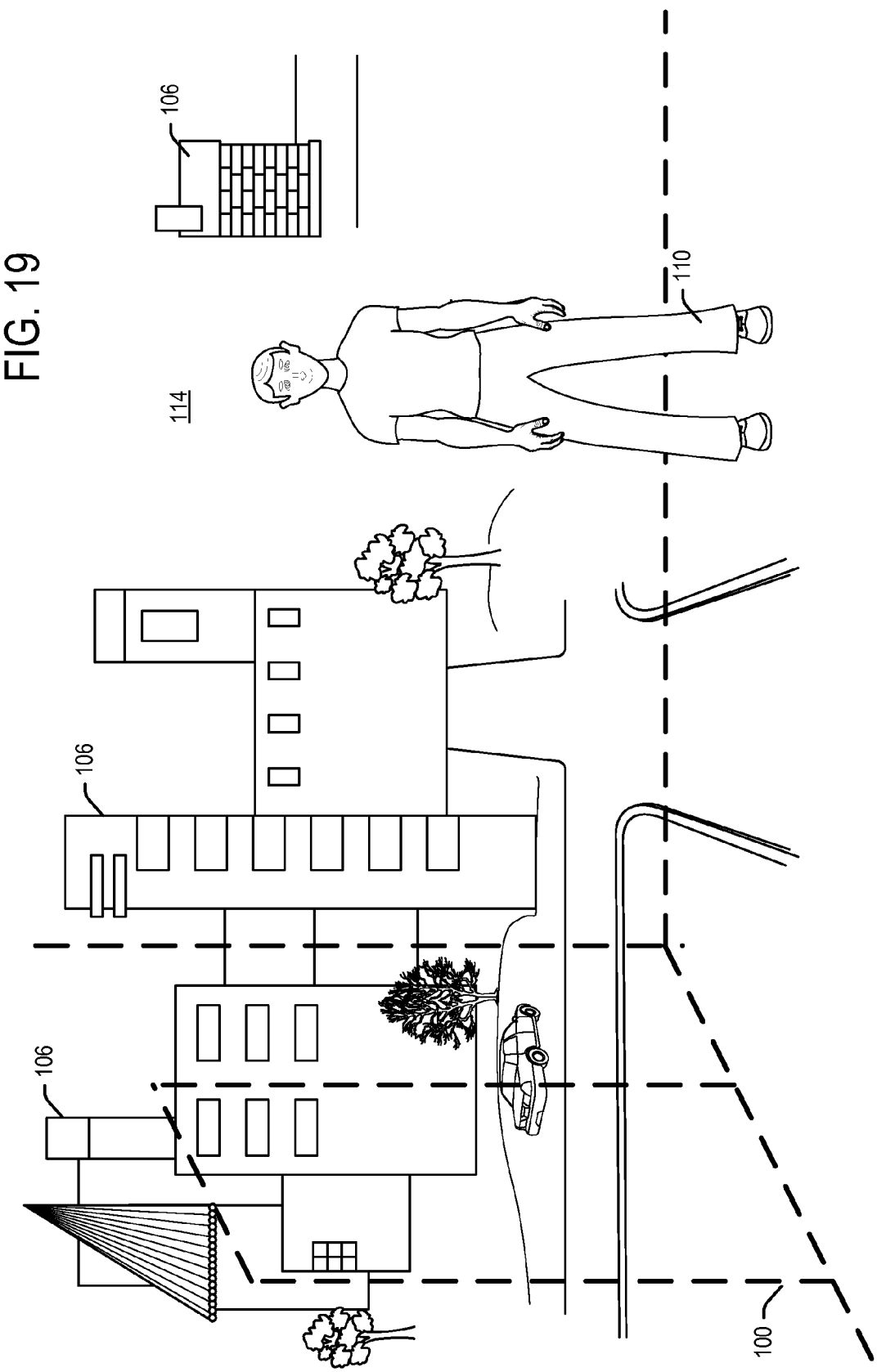

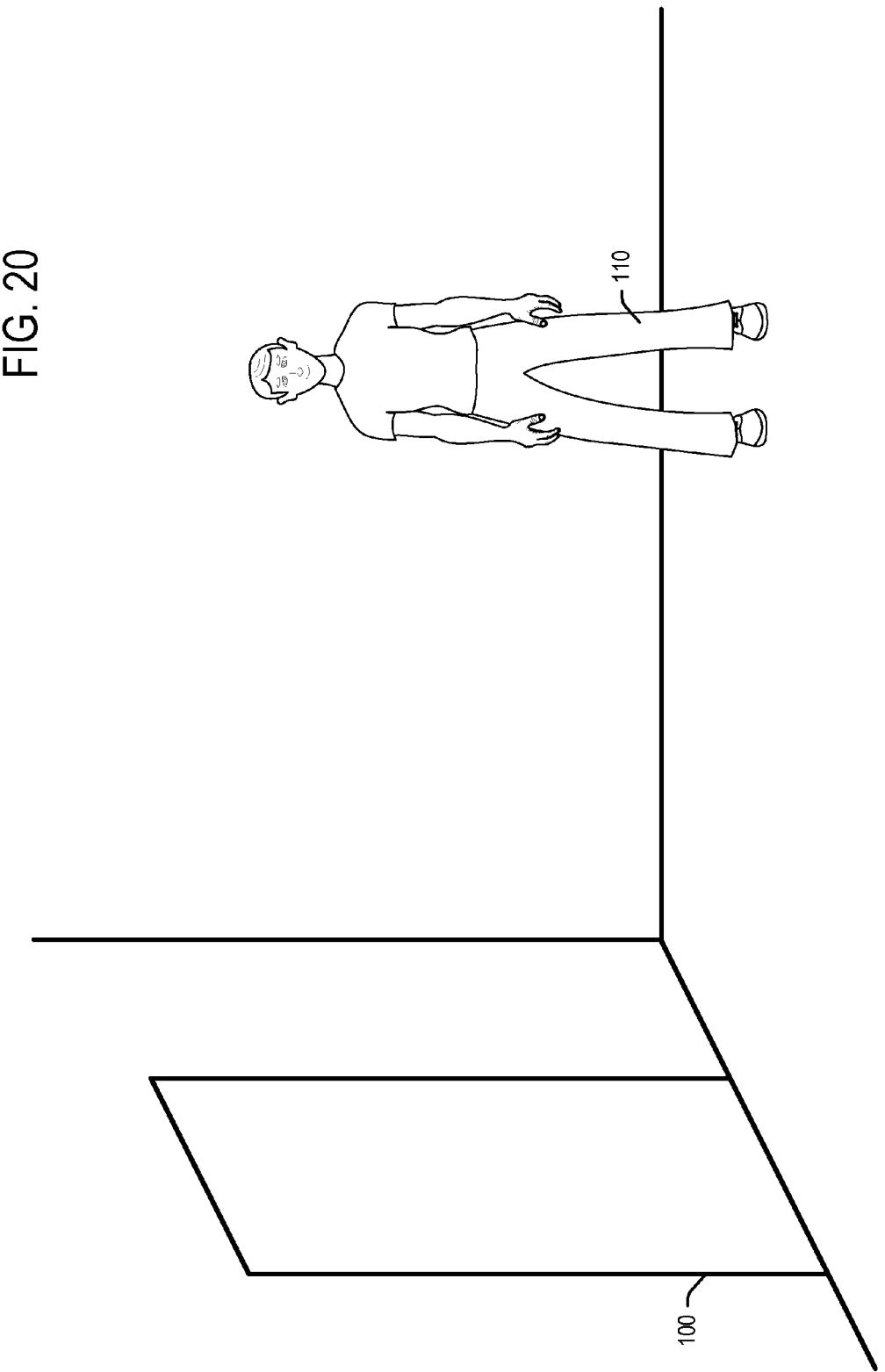

CONVERSATION, PRESENCE AND CONTEXT DETECTION FOR HOLOGRAM SUPPRESSION

PRIORITY CLAIM

The present application is a continuation in part of application Ser. No. 14/255,804, entitled, "Conversation Detection," filed Apr. 17, 2014, which application is currently pending.

SUMMARY

Various embodiments are disclosed relating to detecting a conversation, presence and/or identity of others during presentation of content on a computing device, and taking one or more actions in response to detecting the conversation and/or presence. In one example, an audio data stream is received from one or more sensors, a conversation between a first user and a second user is detected based on the audio data stream, and presentation of a digital content item is modified by the computing device in response to detecting the conversation. In further embodiments, digital content may be modified upon detecting the presence and/or identity of a second person in the vicinity of the first user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 14-20 show example modifications that may be made to the digital content.

DETAILED DESCRIPTION

Computing devices may be used to present digital content in various forms. In some cases, computing devices may provide content in an immersive and engrossing fashion, such as by displaying three dimensional (3D) images and/or holographic images. Moreover, such visual content may be combined with presentation of audio content to provide an even more immersive experience.

Digital content presentations may be consumed in settings other than traditional entertainment settings as computing devices become more portable. As such, at times a user of such a computing device may engage in conversations with others during a content presentation. Depending upon the nature of the presentation, the presentation may be distracting to a conversation.

Thus, embodiments are disclosed herein that relate automatically detecting a conversation between users, and varying the presentation of digital content while the conversation is taking place, for example, to reduce a noticeability of the presentation during the conversation. By detecting conversations, as opposed to the mere presence of human voices, such computing devices may determine the likely intent of users of the computing devices to disengage at least partially from the content being displayed in order to engage in conversation with another human. Further, suitable modifications to presentation of the content may be carried out to facilitate user disengagement from the content.

Conversations may be detected in any suitable manner. For example, a conversation between users may be detected by detecting a first user speaking a segment of human speech (e.g., at least a few words), followed by a second user speaking a segment of human speech, followed by the first user speaking a segment of human speech. In other words, a conversation may be detected as a series of segments of human speech that alternate between different source locations.

FIGS. 1-5 show an example scenario of a physical environment 100 in which a wearer 102 is interacting with a computing device in the form of a head-mounted display (HMD) device 104. The HMD device 104 may be configured to present one or more digital content items to the wearer, and to modify the presentation in response to detecting a conversation between the wearer and another person. The HMD device 104 may detect a conversation using, for example, audio and/or video data received from one or more sensors, as discussed in further detail below.

Figure 1:
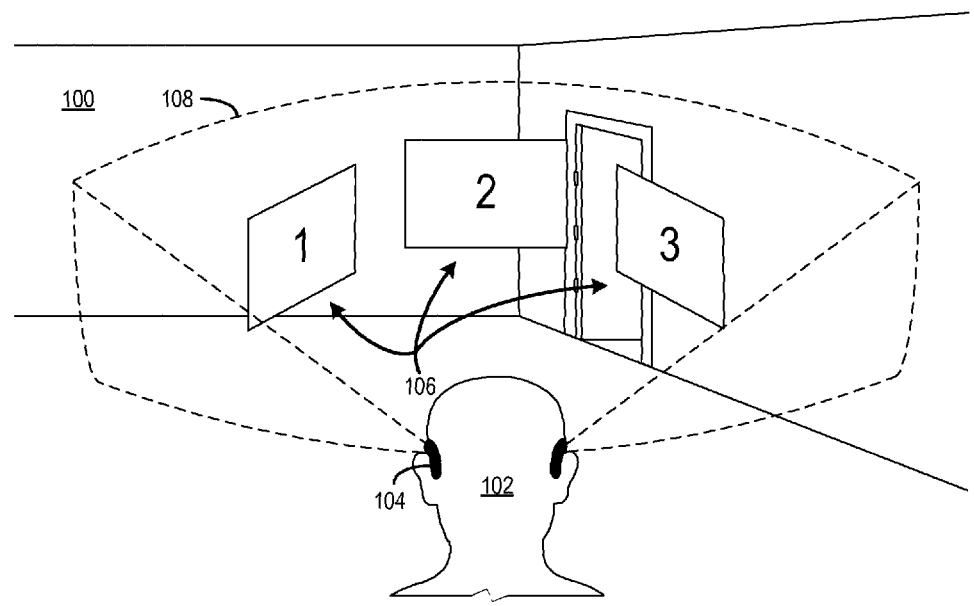
FIG. 1 shows an example of a presentation of digital content items via a head-mounted display (HMD) device.

In FIG. 1, a plurality of digital content items in the form of holographic objects 106 are depicted as being displayed on a see-through display 108 of the HMD device 104 from a perspective of the wearer 102. The plurality of holographic objects 106 may appear as virtual objects that surround the wearer 102 as if floating in the physical environment 100. In another example, holographic objects also may appear as if hanging on walls or other being associated with other surfaces in the physical environment.

In the depicted embodiment, the holographic objects are displayed as "slates" that can be used to display various content. Such slates may include any suitable video, imagery, or other visual content. It is understood that the slates shown are by way of example only, and that any of a wide variety of other holographic objects may be used (some examples of which are set forth below). In one example, a first slate may present an email portal, the second slate may present a social network portal, and the third slate may present a news feed. In another example, the different slates may present different television channels, such as different sporting events. In yet another example, one slate may present a video game and the other slates may present companion applications to the video game, such as a chat room, a social networking application, a game statistic and achievement tracking application, or another suitable application. In some cases, a single digital content item may be displayed via the see-through display. It will be understood that the slates of FIG. 1 are depicted for the purpose of example, and that holographic content may be displayed in any other suitable form.

The HMD device 104 also may be configured to output audio content, alone or in combination with video content, to the wearer 102. For example, the HMD device 104 may include built-in speakers or headphones to play audio content.

It will be understood that the HMD device may be configured to present any suitable type of and number of digital content items to the wearer. Non-limiting examples of digital content that may be presented include movies, television shows, video games, applications, songs, radio broadcasts, podcasts, websites, text documents, images, photographs, etc.

Figure 2:
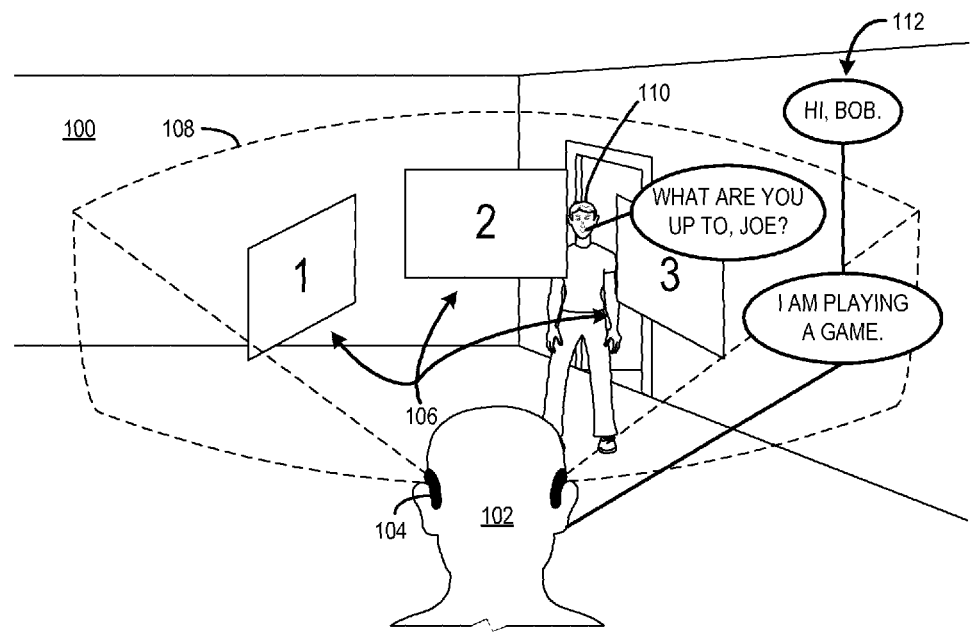
FIG. 2 shows the wearer of the HMD device of FIG. 1 having a conversation with another person.

In FIG. 2, while the wearer 102 is engaged with the plurality of holographic objects 106 displayed via the see-through display 108, another person 110 enters the physical environment 100. Upon seeing the other person 110, the wearer 102 initiates a conversation 112 with the other person. The conversation includes each of the wearer and the other person speaking segments of human speech to each other. Thus, the HMD device may be configured to detect the conversation by detecting the wearer speaking both before and after the other person speaks. Similarly, the HMD device may be configured to detect the conversation by detecting the other person speaking both before and after the wearer of the HMD device speaks.

Figure 3:
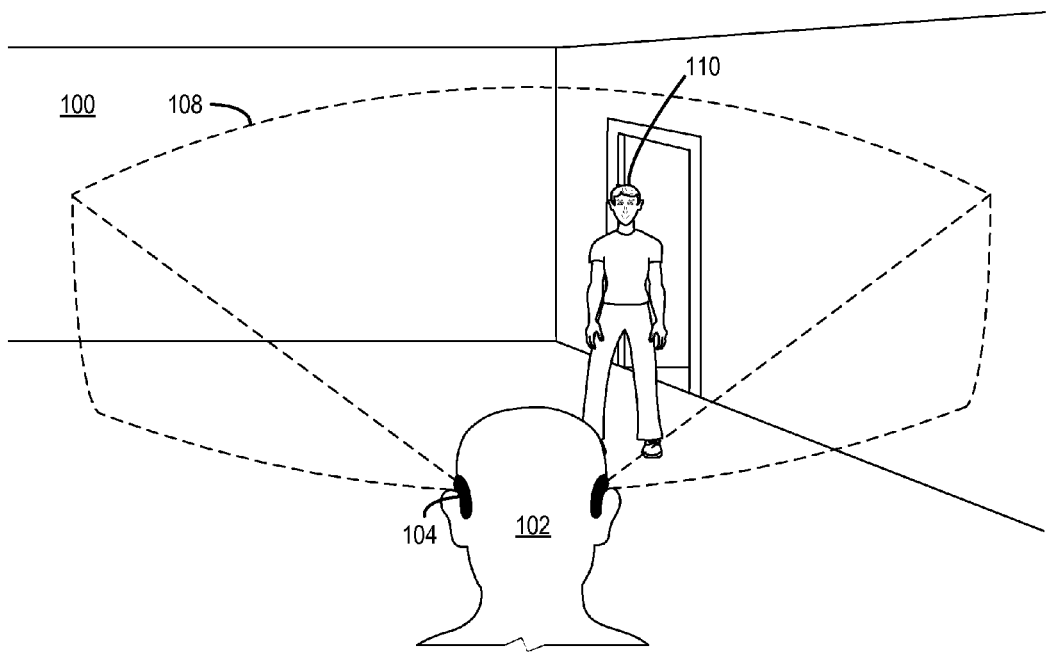
FIGS. 3-5 show example modifications that may be made to the digital content presentation of FIG. 1 in response to detecting the conversation between the wearer and the other person.
Figure 4:
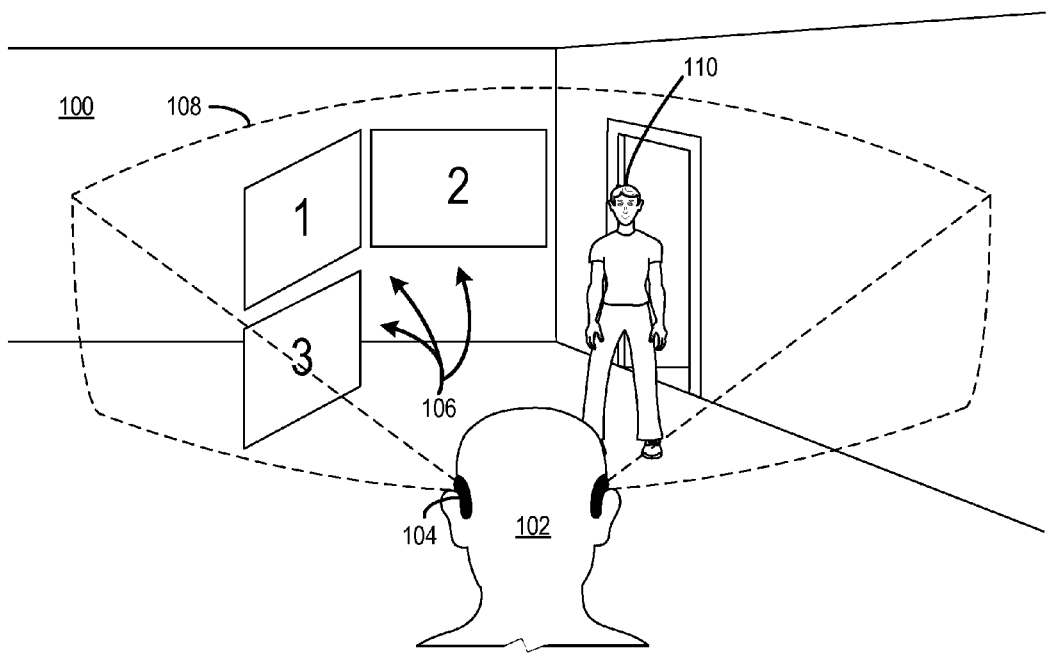
Figure 5:
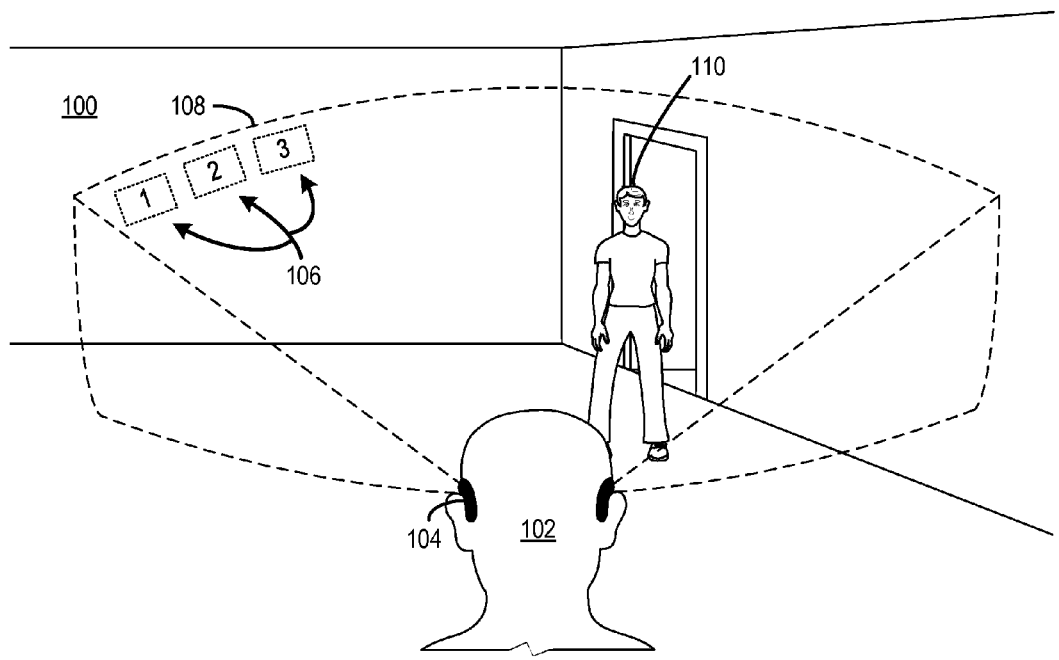

FIGS. 3-5 show non-limiting examples of how the HMD device may modify presentation of the displayed holographic objects in response to detecting the conversation between the wearer and the other person. First referring to FIG. 3, in response to detecting the conversation, the HMD device 104 may be configured to hide the plurality of objects from view on the see-through display 108. In some implementations, the see-through display may be completely cleared of any virtual objects or overlays. Likewise, in some implementations, the objects may be hidden and a virtual border, overlay, or dashboard may remain displayed on the see-through display. In scenarios where the objects present video and/or audio content, such content may be paused responsive to the slates being hidden from view. In this way, the wearer may resume consumption of the content at the point at which the content is paused when the conversation has ended.

In another example shown in FIG. 4, in response to detecting the conversation, the HMD device 104 may be configured to move one or more of the plurality of objects to a different position on the see-through display that may be out of a central view of the wearer, and thus less likely to block the wearer's view of the other person. Further, in some implementations, the HMD device may be configured to determine a position of the other person relative to the wearer, and move the plurality of objects to a position on the see-through display that does not block the direction of the other person. For example, the direction of the other person may be determined using audio data (e.g. directional audio data from a microphone array), video data (color, infrared, depth, etc.), combinations thereof, or any other suitable data.

In another example shown in FIG. 5, in response to detecting the conversation, the HMD device 104 may be configured to change the sizes of the displayed objects, and move the plurality of objects to a different position on the see-through display. As one non-limiting example, a size of each of the plurality of objects may be decreased and the plurality of objects may be moved to a corner of the see-through display. The plurality of objects may be modified to appear as tabs in the corner that may server as a reminder of the content that the wearer was consuming prior to engaging in the conversation, or may have any other suitable appearance. As yet a further example, modifying presentation of the plurality of objects may include increasing a translucency of the displayed objects to allow the wearer to see the other person through the see-through display.

In the above described scenarios, the virtual objects presented via the see-through display are body-locked relative to the wearer of the HMD device. In other words, a position of the virtual object appears to be fixed or locked relative to a position of the wearer of the HMD device. As such, a body-locked virtual object may appear to remain in the same position on the see-through display from the perspective of the wearer even as the wearer moves within the physical environment.

In some implementations, virtual objects presented via the see-through display may appear to the wearer as being world-locked. In other words, a position of the virtual object appears to be fixed relative to a real-world position in the physical environment. For example, a holographic slate may appear as if hanging on a wall in a physical environment. In some cases, a position of a world-locked virtual object may interfere with a conversation. Accordingly, in some implementations, modifying presentation of a virtual object in response to detecting a conversation may include changing a real-world position of a world-locked virtual object. For example, a virtual object located at a real-world position in between a wearer of the HMD device and another user may be moved to a different real-world position that is not between the wearer and the user. In one example, the location may be in a direction other than a direction of the user.

In some implementations, the HMD device may be further configured to detect an end of the conversation. In response to detecting the end of the conversation, the HMD device may be configured to return the visual state of the objects on the see-through display to their state that existed before the conversation was detected (e.g. unhidden, less transparent, more centered in view, etc.). In other implementations, the wearer may provide a manual command (e.g., button push, voice command, gesture, etc.) to reinitiate display of the plurality of objects on the see-through display.

Figure 6:
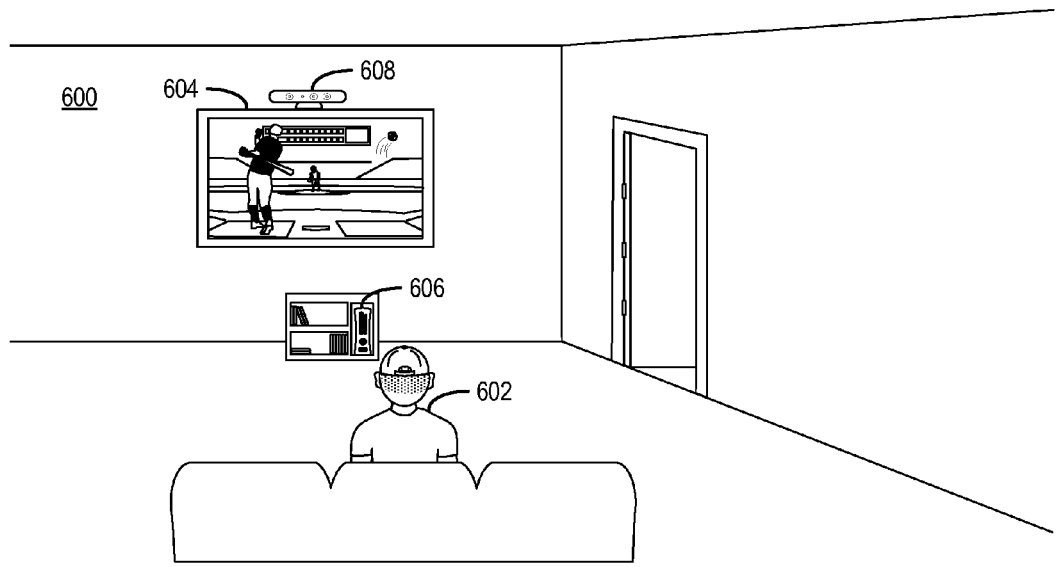
FIG. 6 shows another example presentation of digital content items.
Figure 7:
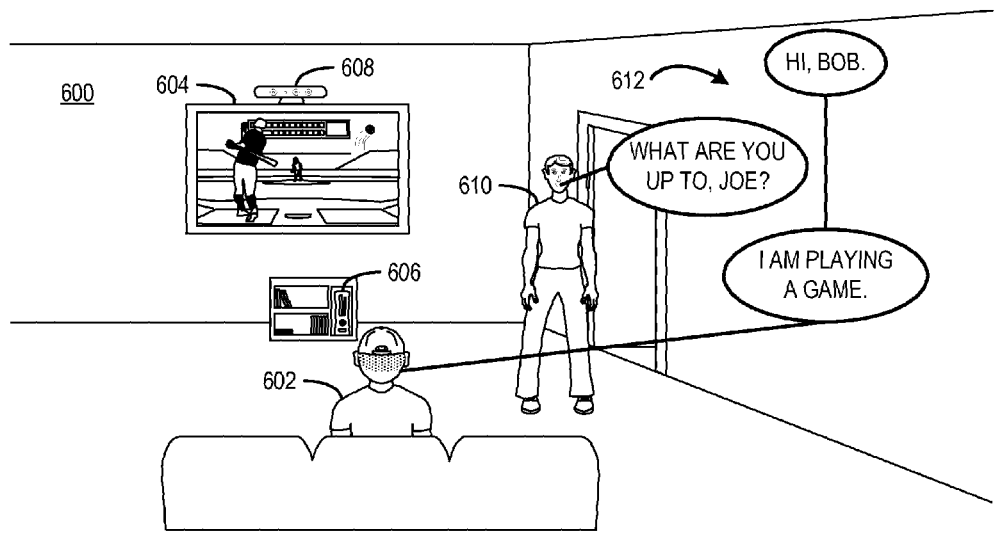
FIG. 7 shows the user of FIG. 6 having a conversation with another person.
Figure 8:
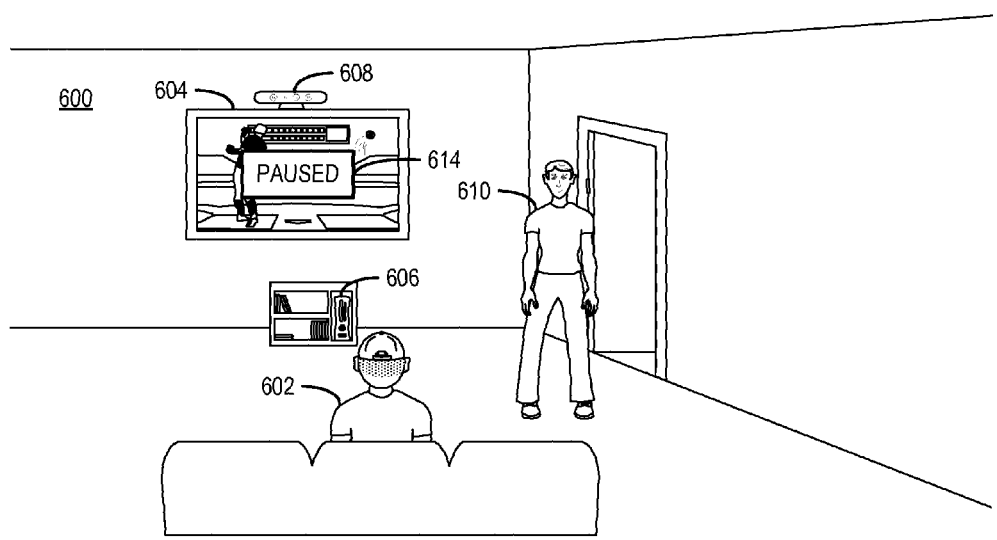
FIG. 8 shows an example modification that may be made to the digital content presentation of FIG. 6 in response to detecting a conversation between the user and the other person.

Conversation detection as described above may be utilized with any suitable computing device, including but not limited to the HMD of FIGS. 1-5. FIGS. 6-8 show another example scenario in which a first user 602 in a physical environment 600 is interacting with a large-scale display 604. The display device 604 may be in communication with an entertainment computing device 606. Further, the computing device 606 may be in communication with a sensor device 608 that includes one or more sensors configured to capture data regarding the physical environment 600. The sensor device may include one or more audio sensors to capture an audio data stream. In some implementations, the sensor device may include one or more image sensors to capture a video data stream (e.g. depth image sensors, infrared image sensors, visible light image sensors, etc.).

The entertainment computing device 606 may be configured to control presentation of one or more digital content items to the other person via the display 604. Further, the entertainment computing device 606 may be configured to detect a conversation between users based on audio and/or video data received from the sensor device 608, and to modify presentation of one or more of the plurality of digital content items in response to detecting the conversation. Although, the sensor device, the large-scale display, and the entertainment computing device are shown as separate components, in some implementations, the sensor device, the large-scale display, and the entertainment computing device may be combined into a single housing.

In FIG. 6, the first user 602 is playing a video game executed by the entertainment computing device 606. While the first user is playing the video game, the sensor device 608 is capturing audio data representative of sounds in the physical environment 600. In FIG. 7, while the first user 602 is engaged in playing the video game displayed on the large-scale display 604, a second user 610 enters the physical environment 600. Upon seeing the second user 610, the first user 602 initiates a conversation 612 with the second user. The conversation includes each of the first user and the second user speaking segments of human speech to each other. As one example, the conversation may be detected by the first user speaking before and after the second user speaks, or by the second user speaking before and after the first user speaks.

The conversation between the first and second users may be received by the sensor device 608 and output as an audio data stream, and the entertainment computing device 606 may receive the audio data stream from the sensor device 608. The entertainment computing device 606 may be configured to detect the conversation between the first user 602 and the second user 610 based on the audio data stream, and modify presentation of the video game in response to detecting the conversation in order to lessen the noticeability of the video game during the conversation.

In further embodiments, instead of detecting the audio stream alone, the present technology may detect the audio stream, the video stream or both the audio stream and the video stream. For example, a conversation may be detected visually using an image sensor according to the present technology. In addition to audio and video data, other information may be available to the computing device 606 which can be used to determine whether to modify a virtual content, and if so, how. For example, the computing device 606 is able to determine whether two people are engaged with a game, possibly based on the input received in the computing device 606 from the respective people through game controllers and/or skeletal tracking. These people may be talking to one another, but in embodiments, the system would not pause or modify the digital content as the system may interpret the conversation as taking place in the context of the game they are playing. On the other hand, the audio data, image data and/or other data received by the computing device 606 may indicate that two people are not engaged with the same game. In this instance, the digital content being displayed to one or both people may be paused or modified as described herein.

The entertainment computing device 606 may take any suitable actions in response to detecting the conversation. In one example, as shown in FIG. 8, the entertainment computing device 606 may modify presentation of the video game by pausing the video game. Further, in some implementations, a visual indicator 614 may be displayed to indicate that presentation of the video game has been modified, wherein the visual indicator may provide a subtle indication to a user that the entertainment computing device is reacting to detection of the conversation. As another example, in response to detecting the conversation, the entertainment computing device may mute or lower the volume of the video game without pausing the video game.

In some implementations, in response to detecting a conversation presentation of a digital content item may be modified differently based on one or more factors. In one example, presentation of a digital content item may be modified differently based on a content type of the digital content item. For example, video games may be paused and live television shows may be shrunk and volume may be decreased. In another example, presentation of a digital content item may be modified differently based on a level of involvement or engagement with the digital content item. For example, a mechanism for estimating a level of engagement based on various sensor indications may be implemented, such as an "involvement meter". In one example, if a user is determined to have a high level of involvement, then presentation of a digital content item may be modified by merely turning down a volume level. On the other hand, if a user is determined to a have a lower level of involvement, then presentation of a digital content item may be modified by hiding and muting the digital content item. Other non-limiting factors that may be used to determine how presentation of a digital content item is modified may include time of day, geographic location, and physical setting (e.g., work, home, coffee shop, etc.).

Figure 9:
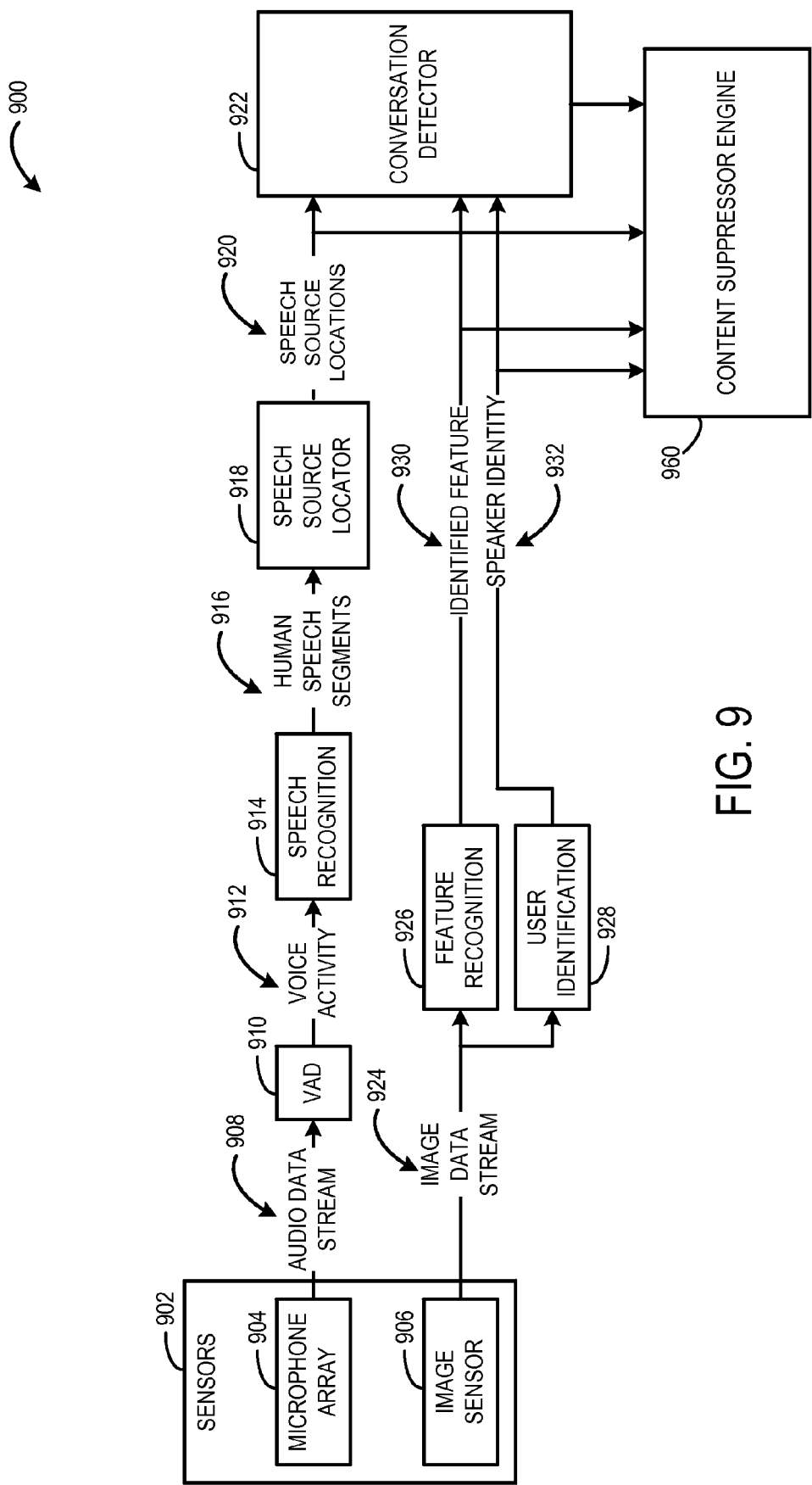
FIG. 9 shows an example of a conversation detection processing pipeline.

The occurrence of conversation may be determined in various manners. For example, a conversation may be detected based on audio data, video data, or a combination thereof. FIG. 9 shows an example of a conversation processing pipeline 900 that may be implemented in one or more computing devices to detect a conversation. The conversation processing pipeline 900 may be configured to process data streams received from a plurality of different sensors 902 that capture information about a physical environment.

In the depicted embodiment, an audio data stream 904 may be received from a microphone array 904 and an image data stream 924 may be received from an image sensor 906. The audio data stream 908 may be passed through a voice activity detection (VAD) stage 910 configured to determine whether the audio data stream is representative of a human voice or other background noise. Audio data indicated as including voice activity 912 may be output from the VAD stage 910 and fed into a speech recognition stage 914 configured to detect parts of speech from the voice activity. The speech recognition stage 914 may output human speech segments 916. For example, the human speech segments may include parts of words and/or full words.

In some implementations, the speech recognition stage may output a confidence level associated with a human speech segment. The conversation processing pipeline may be configured to set a confidence threshold (e.g., 50% confident that the speech segment is a word) and may reject human speech segments having a confidence level that is less than the confidence threshold.

In some implementations, the speech recognition stage may be locally implemented on a computing device. In other implementations, the speech recognition stage may be implemented as a service located on a remote computing device (e.g., implemented in a computing cloud network), or distributed between local and remote devices.

Human speech segments 916 output from the speech recognition stage 914 may be fed to a speech source locator stage 918 configured to determine a source location of a human speech segment. In some implementations, a source location may be estimated by comparing transducer volumes and/or phases of microphones in the microphone array 904.

For example, each microphone in the array may be calibrated to report a volume transducer level and/or phase relative to the other microphones in the array. Using digital signal processing, a root-mean-square perceived loudness from each microphone transducer may be calculated (e.g., every 20 milliseconds, or at another suitable interval) to provide a weighted function that indicates which microphones are reporting a louder audio volume, and by how much. The comparison of transducer volume levels of each of the microphones in the array may be used to estimate a source location of the captured audio data.

In some implementations, a beamforming spatial filter may be applied to a plurality of audio samples of the microphone array to estimate the source location of the captured audio data. In the case of an HMD device, a beam-formed audio stream may be aimed directly forward from the HMD device to align with a wearer's mouth. As such, audio from the wearer and anyone directly in front of the wearer may be clear, even at a distance. In some implementations, the comparison of transducer volume levels and the beamforming spatial filter may be used in combination to estimate the source location of captured audio data.

The speech source locator stage 918 may feed source locations of human speech segments 920 to a conversation detector stage 922 configured to detect a conversation based on determining that the segments of human speech alternate between different source locations. The alternating pattern may indicate that different users are speaking back and forth to each other in a conversation. Once a conversation is detected, a software engine referred to as a content suppressor engine 960 may suppress, or modify, the digital content as explained herein.

In some implementations, the conversation detector stage 922 may be configured to detect a conversation if segments of human speech alternate between different source locations within a threshold period of time or the segments of human speech occur within a designated cadence range. The threshold period of time and cadence may be set in any suitable manner. The threshold period may ensure that alternating segments of human speech occur temporally proximate enough to be conversation and not unrelated speech segments.

In some implementations, the conversation processing pipeline 900 may be configured to analyze the audio data stream 908 to determining whether one or more segments of human speech originate from an electronic audio device, such as from a movie or television show being presented on a display. In one example, the determination may be performed based on identifying an audio or volume signature of the electronic audio device. In another example, the determination may be performed based on a known source location of the electronic audio device. Furthermore, the conversation processing pipeline 900 may be configured to actively ignore those one or more segments of human speech provided by the electronic audio device when determining that segments of human speech alternate between different source locations. In this way, for example, a conversation taking place between characters in a movie may not be mistaken as a conversation between real human users.

In some implementations, analysis of the audio data stream may be enhanced by analysis of the image data stream 924 received from the image sensor 906. For example, the image data stream may include images of one or both speakers potentially engaged in a conversation (e.g., images of a user from the perspective of a wearer of an HMD device or images of both users from the perspective of a sensor device). It is understood that the image data stream may comprise a variety of different image data, including for example depth data and RGB data. The image data stream 924 may be fed to a feature recognition stage 926. The feature recognition stage 926 may be configured, for example, to analyze images to determine whether a user's mouth is moving. It is understood that the feature recognition stage 926 may recognize a wide variety of features other than mouth or facial features. Skeletal tracking algorithms may be used to track and recognize a variety of body and other features as well. The feature recognition stage 926 may output an identified feature, and/or confidence level 930 indicative of a level of confidence that a user is speaking. The confidence level 930 may be used by the conversation detector stage 922 in combination with the analysis of the audio data stream to detect a conversation. As explained below, image data stream 924 and feature recognition 926 may be used by themselves (independently of whether a conversation is taking place) to suppress holographic objects.

The image data stream 924 also may be fed to a user identification stage 928. The user identification stage 928 may be configured to analyze images to recognize a user that is speaking. For example, a facial or body structure may be compared to user profiles to identify a user. It will be understood that a user may be identified based on any suitable visual analysis. The user identification stage 928 may output the identity of a speaker 932 to the conversation detector stage 922, as well as a confidence level reflecting a confidence in the determination. The conversation detector stage 922 may use the speaker identity 932 to classify segments of human speech as being spoken by particular identified users. In this way, a confidence of a conversation detection may be increased. Once a conversation is detected in this way, the content suppressor engine 960 may suppress the digital content as explained herein. In further embodiments explained below, the audio data stream 908, speech recognition stage 914, speech source locator 918, image data stream 924, feature recognition 926 and user identification 928 may be fed directly to the content suppressor engine 960 and used by themselves (independently of whether a conversation is taking place) to suppress digital content. It will be understood that the depicted conversation processing pipeline is merely one example of a manner in which an audio data stream is analyzed to detect a conversation, and any suitable approach may be implemented to detect a conversation without departing from scope of the present disclosure.

Figure 10:
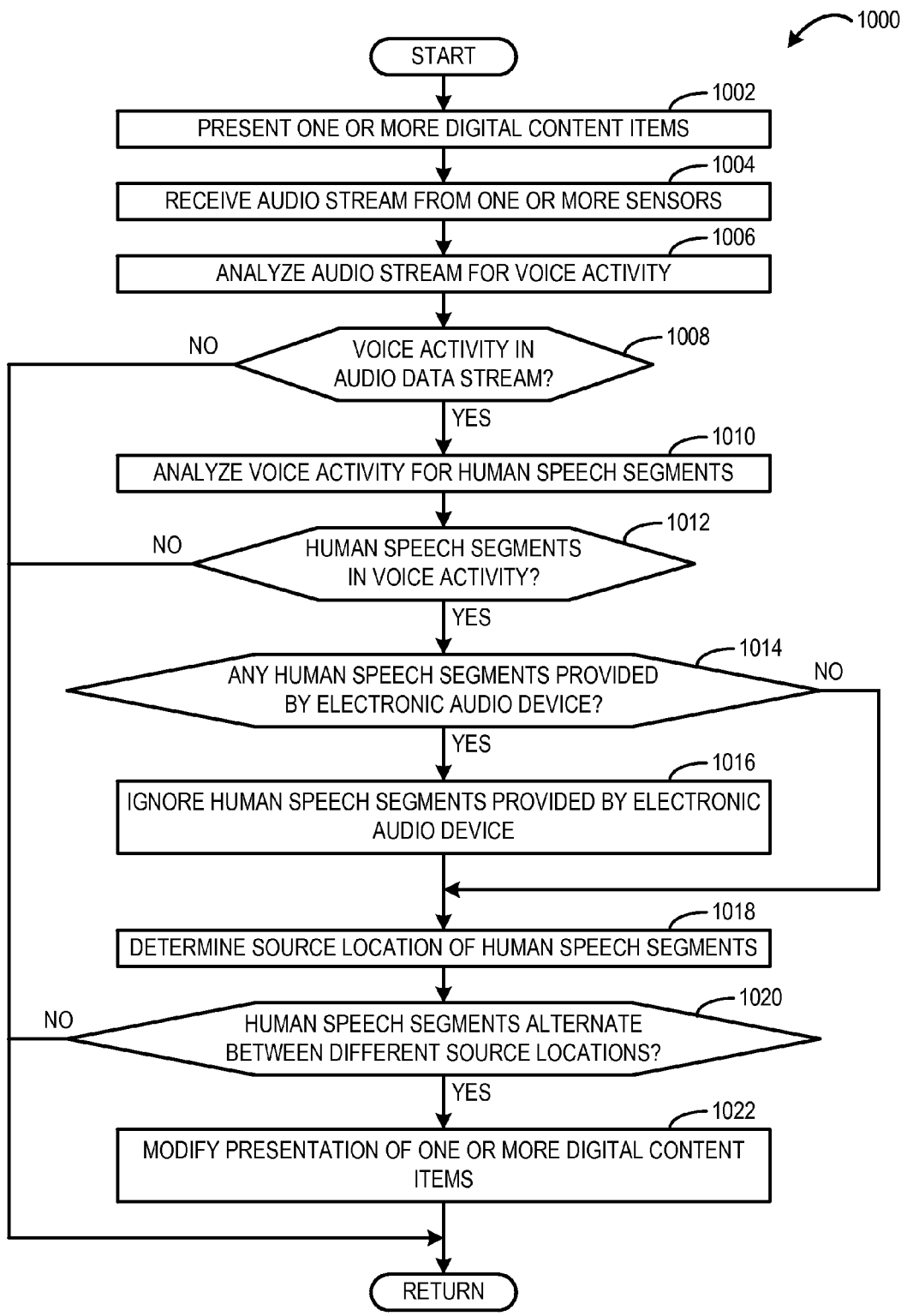
FIG. 10 shows a flow diagram depicting an example of a method for detecting a conversation.

FIG. 10 shows a flow diagram depicting an example method 1000 for detecting a conversation via a computing device in order to help reduce the noticeability of content presentation during conversation. Method 1000 may be performed, for example, by the HMD device 104 shown in FIG. 1, the entertainment computing device 606 shown in FIG. 6, or by any other suitable computing device.

At 1002, method 1000 includes presenting one or more digital content items. For example, presenting may include displaying a video content item on a display. In another example, presenting may include playing an audio content item. Further, at 1004, method 1000 includes receiving an audio data stream from one or more sensors. In one example, the audio data stream may be received from a microphone array.

At 1006, method 1000 includes analyzing the audio data stream for voice activity, and at 1008, determining whether the audio data stream includes voice activity. If the audio data stream includes voice activity, then method 1000 moves to 1010. Otherwise, method 1000 returns to other operations.

At 1010, method 1000 includes analyzing the voice activity for human speech segments, and at 1012, determining whether the voice activity includes human speech segments. If the voice activity includes human speech segments, then method 1000 moves to 1014. Otherwise, method 1000 returns to other operations.

At 1014, method 1000 includes determining whether any human speech segments are provided by an electronic audio device. If any of the human speech segments are provided by an electronic audio device, then method 1000 moves to 1016. Otherwise, method 1000 moves to 1018. At 1016, method 1000 includes actively ignoring those human speech segments provided by an electronic audio device. In other words, those human speech segments may be excluded from any consideration of conversation detection. At 1018, method 1000 includes determining a source location of each human speech segment of the audio data stream. Further, at 1020, method 1000 includes determining whether the human speech segments alternate between different source locations. In one example, a conversation may be detected when human speech segments spoken by a first user occur before and after a human speech segment spoken by a second user. In another example, a conversation may be detected when human speech segments spoken by the second user occur before and after a human speech segment spoken by the first user. In some implementations, this may include determining if the alternating human speech segments are within a designated time period. Further, in some implementations, this may include determining if the alternating human speech segments occur within a designated cadence range. If the human speech segments alternate between different source locations (and are within the designated time period and occur within the designated cadence range), then a conversation is detected and method 1000 moves to 1022. Otherwise, method 1000 returns to other operations.

If a conversation is detected, then at 1022 method 1000 includes, in response to detecting the conversation, modifying presentation of the one or more digital content items. For example, the presentation may be paused, a volume of an audio content item may be lowered, one or more visual content items may be hidden from view on a display, one or more visual content items maybe moved to a different position on a display, and/or a size of the one or more visual content items on a display may be modified.

By modifying presentation of a digital content item in response to detecting a conversation between users, presentation of the digital content item may be made less noticeable during the conversation. Moreover, in this way, a user does not have to manually modify presentation of a digital content item, such as manually pausing playback of content, reducing a volume, etc. when a conversation is initiated.

In at least some of the embodiments described above, digital content may be modified upon detecting a conversation between an HMD wearer and another person who has engaged with the HMD wearer. Embodiments of the present technology also contemplate modifying a digital content in situations other than conversation detection. For example, content may be suppressed in any of a variety of manners upon simply detecting another person within the visual field of view of the HMD wearer, and/or within hearing range of a microphone on the HMD device 104.

As explained above, a person's location may be determined in a variety of ways, including for example using speech source locators, image data and/or gps data. Once a person is within the field of view of a user, audible range of the user and/or within the same room or vicinity of the user, this may be detected by the HMD device 104, and, in response, the digital content may be suppressed. As a further refinement to this embodiment, contextual cues (described below) may further be used to discern between people for which the HMD wearer would like to suppress the content, and those for which the HMD wearer likely does not wish to suppress the content.

Embodiments further contemplate recognizing a voice, and, in response, suppressing the digital content. For example, a controller (explained below) associated with an HMD device 104 may store a known voice list correlating audio voice data to certain family, friends, associates, etc. of the HMD wearer 102. Additionally, an HMD wearer 102 may store some content suppression action in the known voice list to be taken in association with one or more of these people. While engaged with content, for example wearing HMD device 104, if the device 104 detects audio voice data correlating to some confidence level with a voice on the known voice list, the associated content suppression action from the list may be taken. This may be true whether or not the speaker is within the visible field of view of the HMD wearer 102, and whether or not it is determined that the speaker is speaking to the HMD wearer 102.

As described above, the HMD device 104 may use image data to identify one or more people within the field of view of the HMD wearer 102. This identification may be used to strengthen or lessen the likelihood that a conversation is taking place as described above. However, in embodiments, identification of another person by image data may be used by itself to suppress content. For example, a controller (explained below) associated with an HMD device 104 may store a known person list correlating image data to certain family, friends, associates, etc. of the HMD wearer 102. Additionally, an HMD wearer 102 may store some content suppression action in the known person list to be taken in association with one or more of these people. While engaged with content, for example wearing HMD device 104, if the device 104 detects image data correlating to some confidence level with a person on the known person list, the associated content suppression action from the list may be taken. This may be true whether or not the identified person is speaking.

As described above, the HMD device 104 may use image data to identify a physical feature of one or more people within the field of view of the HMD wearer 102. This physical feature, for example a mouth that is moving, may be used to strengthen or lessen the likelihood that a conversation is taking place as described above. However, in embodiments, identification of a physical feature by image data may be used by itself to suppress content. For example, captured image data may indicate to some confidence level that a person in the field of view is facing the HMD wearer 102, is pointing at the HMD wearer 102 and/or is gazing at the HMD wearer 102. Upon such detection, the content with which the HMD wearer 102 is engaged may be suppressed.

In embodiments, upon detecting audio or image data as described above, content may be suppressed. However, in further embodiments, once audio or image data triggering content suppression is detected, the present technology may further look for contextual cues to confirm or rebut a presumption that content is to be suppressed. These contextual cues may vary in different embodiments. In one example, a user may define certain geographic locations where content is, or is not, to be suppressed. The HMD device 104 may include location identification means, including for example a GPS receiver and/or WIFI network connection. A user may store user preferences relating to certain locations where, upon detecting another person, the content is to be suppressed, or the content is not to be suppressed. These locations may for example include home, work or in transit. Where another person is detected, the content may or may not be suppressed in accordance with the user stored preferences.

The time of day or day of the week may also be a contextual cue which may be set up by the HMD wearer 102 to confirm or rebut content suppression upon detecting a person. As noted above, the present system may determine how attentive a wearer is to the content. This may further be used as a contextual cue. It is understood that contextual cues instead of or in addition to those described above may be used in further embodiments. In further embodiments, where the system determines that a person is present and content is to be suppressed, the system may provide a visual and/or audio prompt to the HMD wearer 102 to confirm or deny the content suppression.

In further embodiments, the specific content or type of content being viewed by the HMD wearer 102 may also be used as a contextual cue to suppress or not suppress the content. For example, as set forth above, a user may be viewing an important event and not wish to suppress that content if another person engages or is near the wearer.

Figure 13:
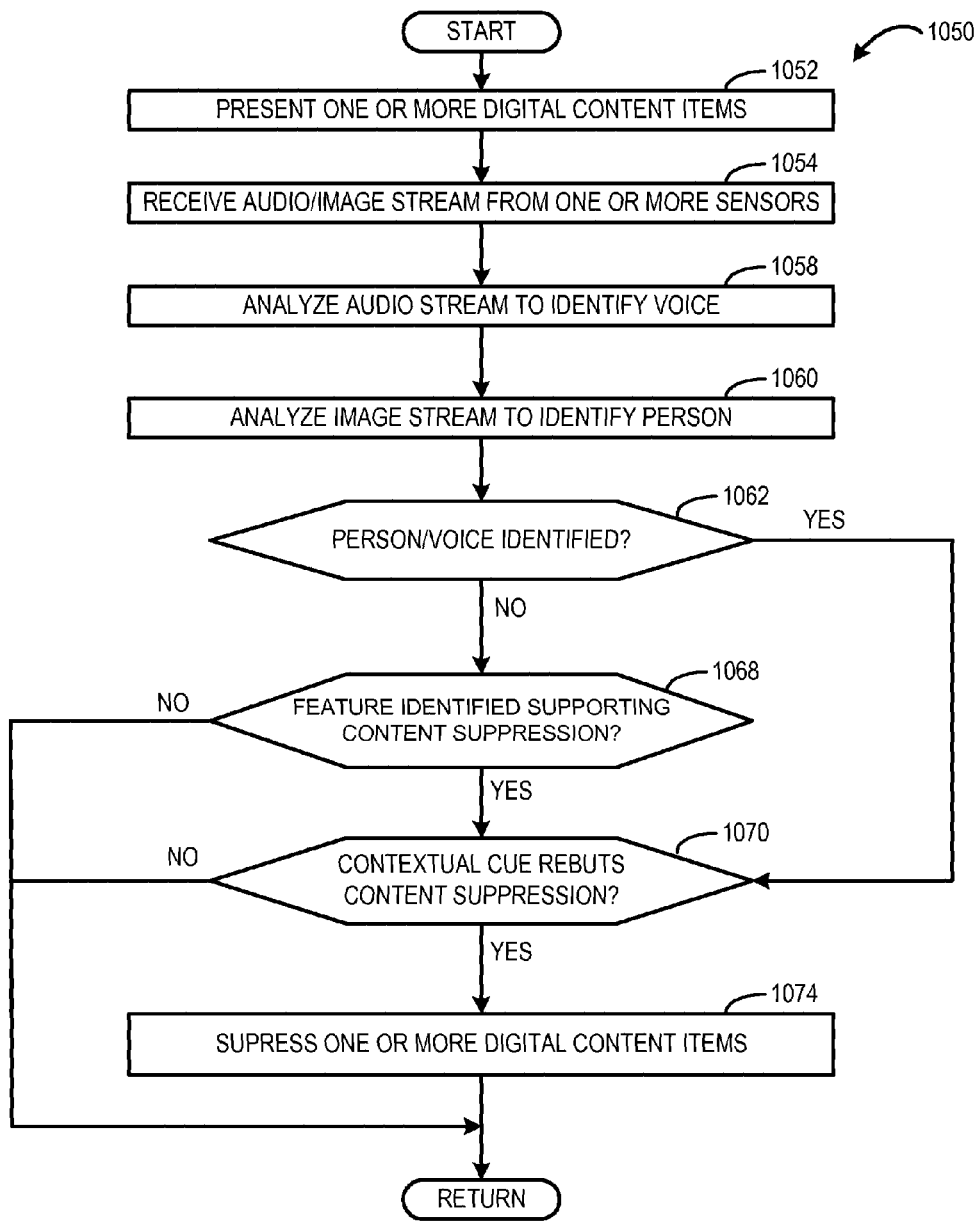
FIG. 13 shows a flow diagram depicting an example of a method for detecting situations for content suppression.

FIG. 13 shows a flow diagram depicting an example method 1050 for detecting when to suppress digital content via a computing device when another person is present. Method 1050 may be performed, for example, by the HMD device 104 shown in FIG. 1, the entertainment computing device 606 shown in FIG. 6, or by any other suitable computing device.

At 1052, method 1050 includes presenting one or more digital content items. For example, presenting may include displaying a video content item on a display or in a physical environment. In another example, presenting may include playing an audio content item. Further, at 1054, method 1050 includes receiving streams of audio data and image data from two or more sensors. In one example, the audio data stream may be received from a microphone array, and the image data steam may be received from one or more image sensors such as a depth camera and/or RGB camera.

At 1058, method 1050 includes analyzing the audio data stream to identify a known voice as described above, and at 1060, method 1050 includes analyzing the image data stream to identify a known person as described above. At 1062, method 1050 determines whether a known person or known voice has been detected. If not, method 1050 next checks in step 1068 whether some feature in the image data is identified that supports content suppression. As noted above, the HMD device 104 may detect that a person is looking, pointing or gazing at the HMD wearer 102.

If a known person or voice is not detected in step 1062, and no feature is identified supporting content suppression in step 1068, the method may return to start. On the other hand, if either a known person or voice is detected in step 1062, or a feature is identified supporting content suppression in step 1056, the method 1050 may next check whether there is a contextual cue that rebuts content suppression. As set forth above, a user may set up rules governing places, times, situations and other contexts where the content is, or is not, to be suppressed when another person is detected. If a contextual cue rebuts content suppression in step 1070, then content is not suppressed. On the other hand, if no contextual cue rebuts content suppression is in step 1070, then the digital content may be suppressed in step 1074.

Upon some trigger event described above (e.g., detecting a conversation, presence or voice of another, or identifying another person by image or audio data), the digital content may be suppressed. As used herein, content suppression refers to removing or turning off the digital content, minimizing or altering a size of the digital content, or modifying the digital content in some other manner. The digital content may be virtual content or content displayed on a display.

Figure 14:
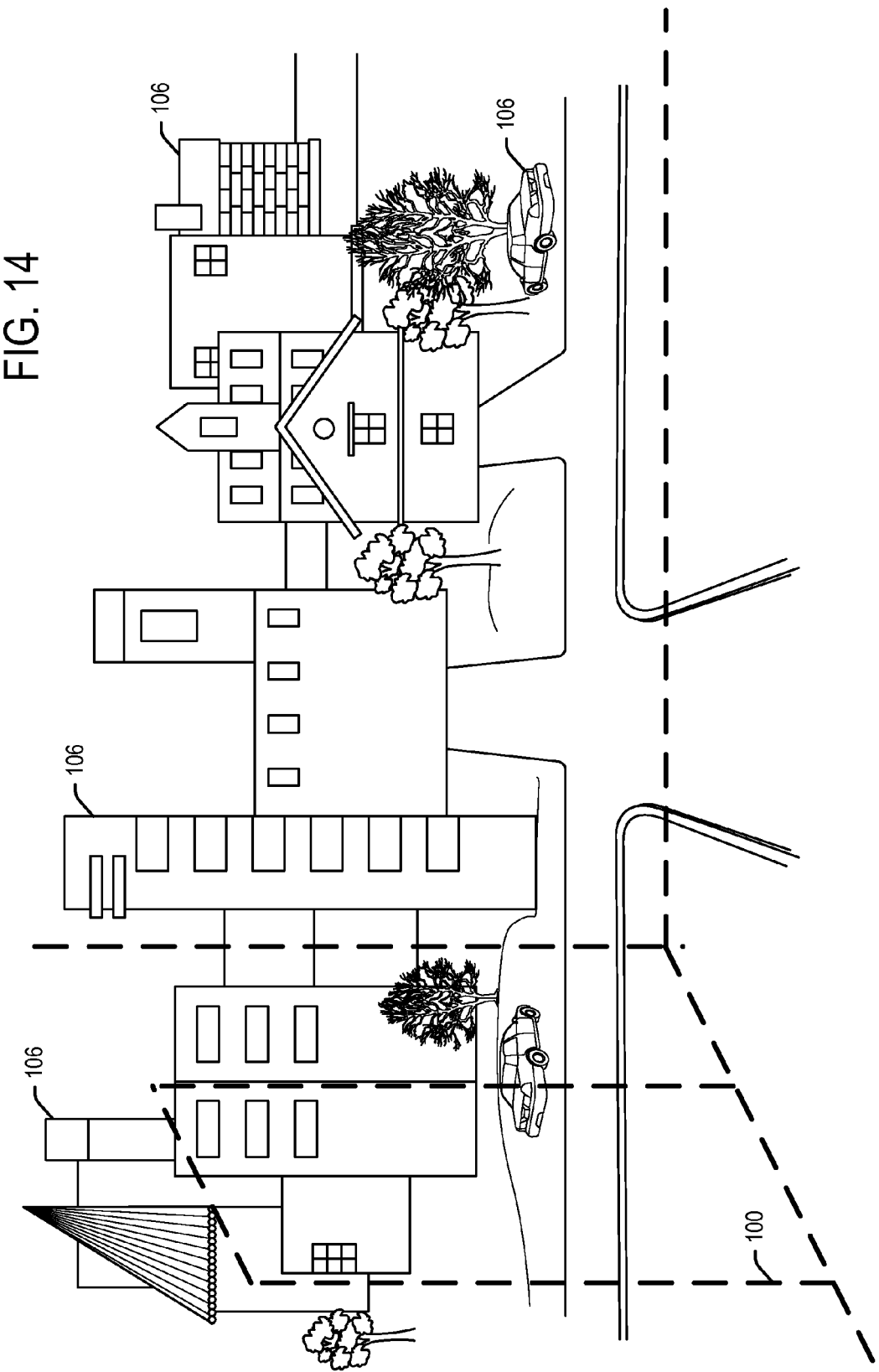

Some of these forms of content suppression are described above with respect to FIGS. 4-6. Others are described in greater detail with regard to FIGS. 14-20. FIG. 14 shows a view through an HMD device 104. The mixed reality environment includes a hologram 106 and a physical environment 100 (shown in dashed lines for clarity). In this example, the hologram 106 is a town or city, but it may be any of various other holograms in further embodiment.

Figure 15:
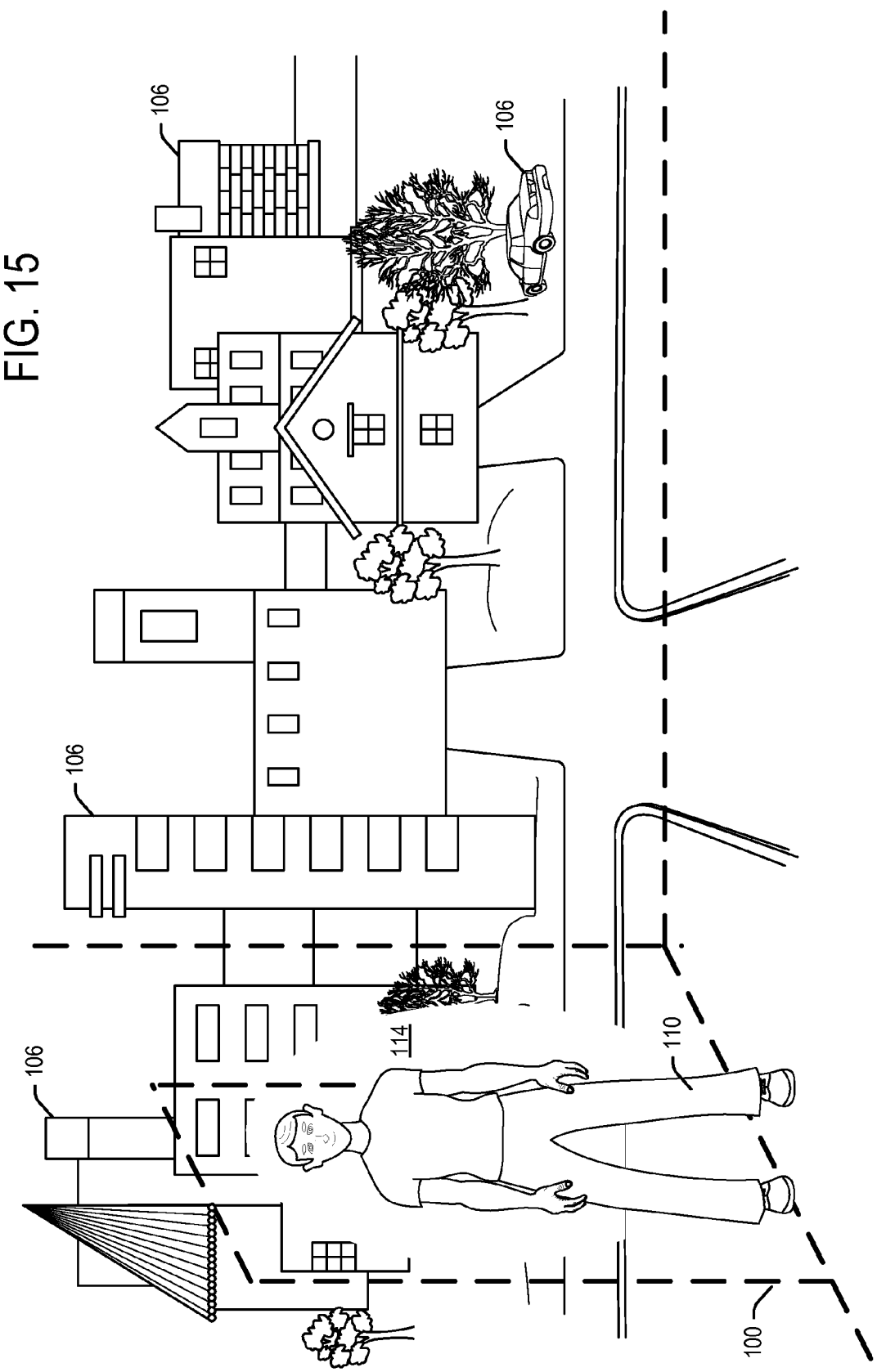

FIG. 15 shows a person 110 entering the field of view of the HMD wearer 102. The system runs through the steps of the flowcharts of FIGS. 10 and/or 13 and determines that the content (hologram 106 in this example) is to be suppressed. In FIG. 15, the hologram is suppressed by providing a cutout 114 in the hologram around the person 110. In this way, the person 110 may be clearly visible to the HMD wearer 102 without the hologram 106 occluding the person 110. As noted above, where the hologram 106 is accompanied by sound, the sound may or may not be turned off, or it may be turned down to some predefined level.

The size and position of cutout 114 may be determined in a variety of ways. The HMD device 104 is able to identify the position of the person 110 in three-dimensional space from image sensors (explained below) on the HMD device 104. The HMD device 104 is able to further identify the outline of the person 110, for example by changes in depth data in the image data surrounding the person 110. As such, the controller can define the cutout to be centered around the person 110, and can define a size of the cutout 114 to include the person 110 plus some predefined border around the person 110. The shape of the cutout 114 may be some predefined shape. The cutout 114 has an oval shape in FIG. 15, but the shape may be square, rectangular, circular or a variety of other shapes in further embodiments. In a further example, the cutout may be the shape of the person 110 plus some border around the person.

In an embodiment, the cutout 114 may be provided by cameras in the HMD device 104 not displaying the hologram in the area of the cutout 114. In further embodiments, the cutout 114 may be provided by not displaying portions of the hologram in front of the person 110 (i.e., between the HMD wearer 102 and the person 110), and displaying an opaque background in the shape of the cutout 114 behind the person 110 (i.e. the person 110 is between the cutout 110 and HMD wearer 102). In this way, portions of the hologram 106, and possibly the physical environment 100, are occluded by the opaque background of the cutout 114. The opaque background may be white, but it may be other colors in further embodiments.

Figure 16:
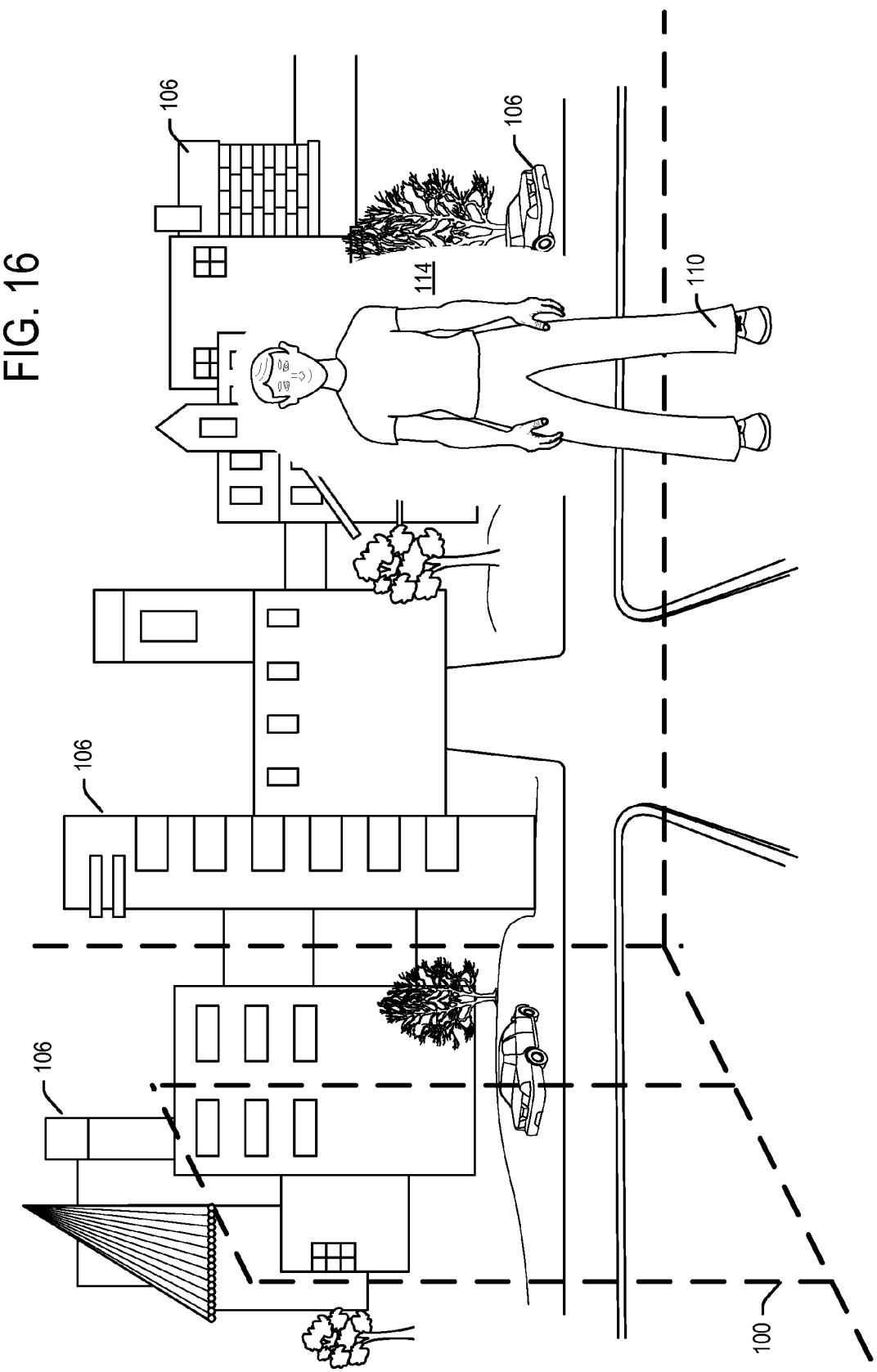

The controller maps the position of the person 110 in the field of view several times a second so that the cutout may stay positioned around the person 110 as the person moves in the field of view. FIG. 16 shows the user having moved to a new location within the physical environment 100, with the cutout 114 remaining centered around the person 110.

Figure 17:
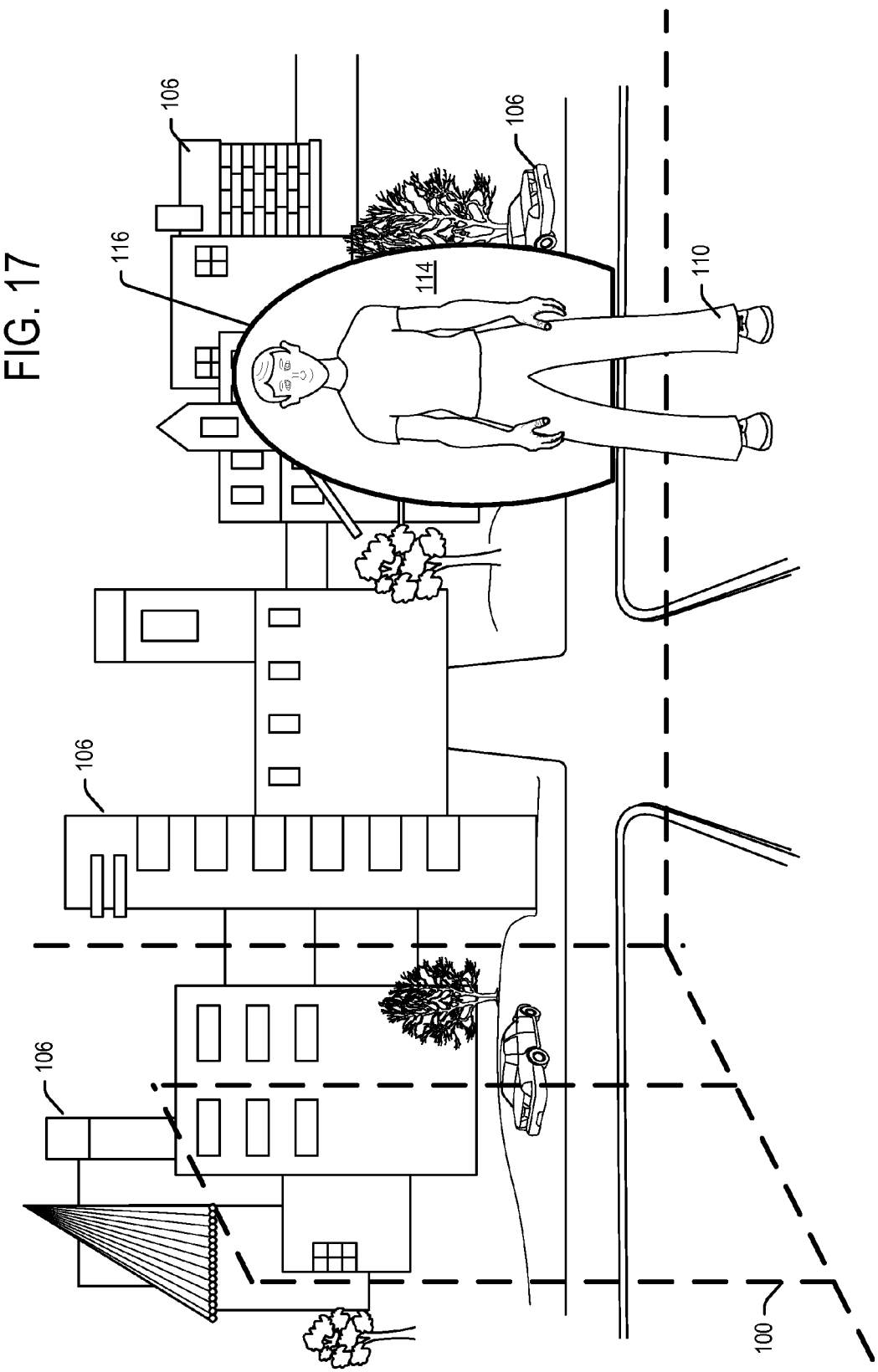
Figure 18:
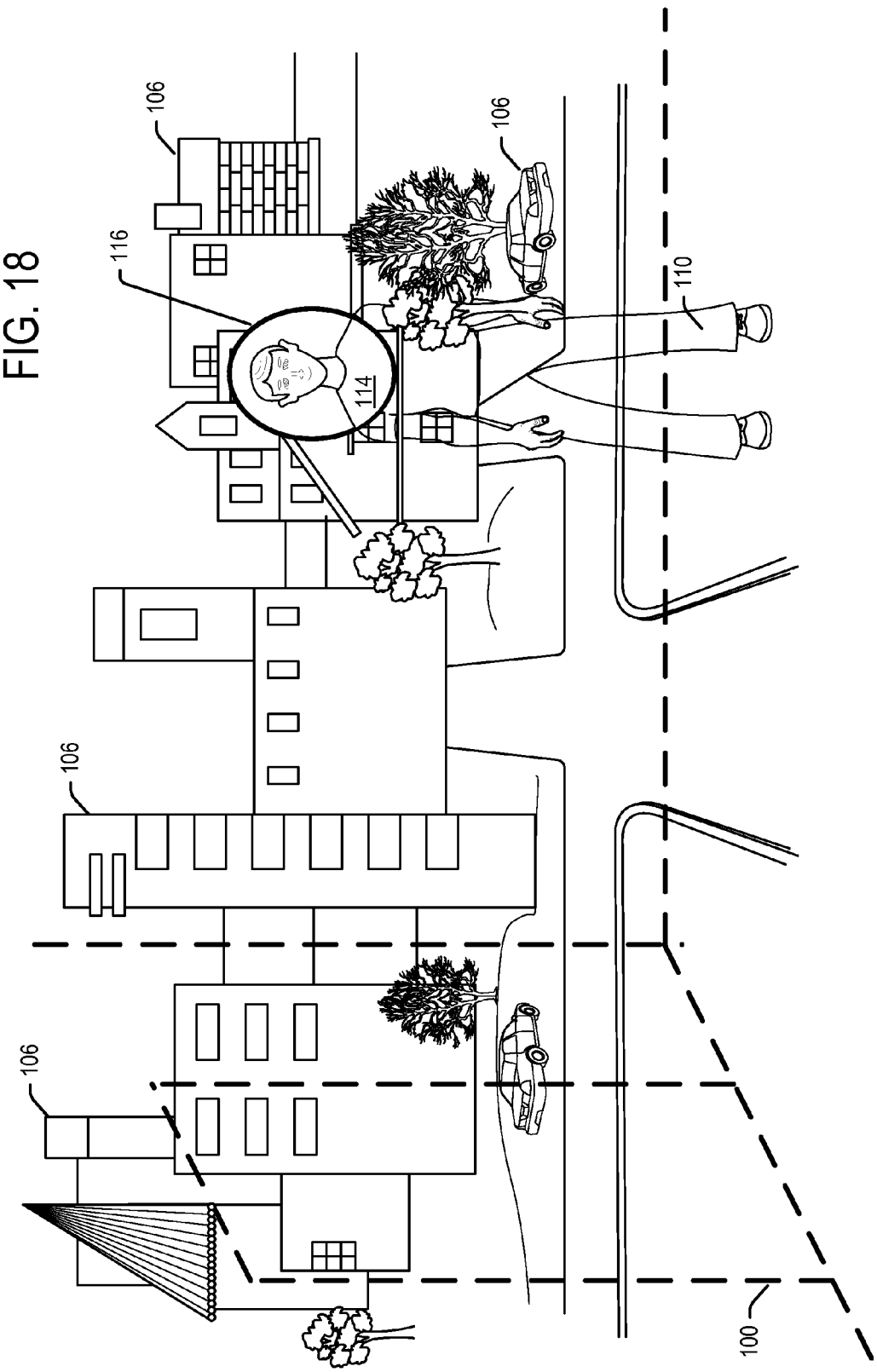

FIG. 17 is similar to FIG. 16, but in this embodiment, a border 116 is provided around the cutout 114 to further emphasize the cutout 114. The border 116 may have various line thicknesses and colors in different embodiments. FIG. 18 is similar to FIG. 16, but shows a smaller cutout 114 and border 116 around the person 110. In this example, the cutout 114 and border 116 are centered around the head of the person 110. The person's head may be identified by feature recognition as described above. The border 116 may be omitted around the cutout 114 in FIG. 18 in further embodiments.

FIG. 19 is similar to FIGS. 17 and 18, but in this embodiment, discrete portions of the hologram 106 are removed, that is, either not displayed or are occluded. Discrete portions here means that whole pieces or self-contained units of the hologram are removed. Thus, in the example of FIG. 19 showing buildings and other structures of a town, entire buildings or modular sections of buildings, are removed. Discrete portions of the hologram may be defined in the controller or graphics engine responsible for rendering hologram 106.

As noted above, in further embodiments, the hologram 106 may be suppressed by completely pausing or removing the hologram. Such an example is shown in FIG. 20.

Figure 11:
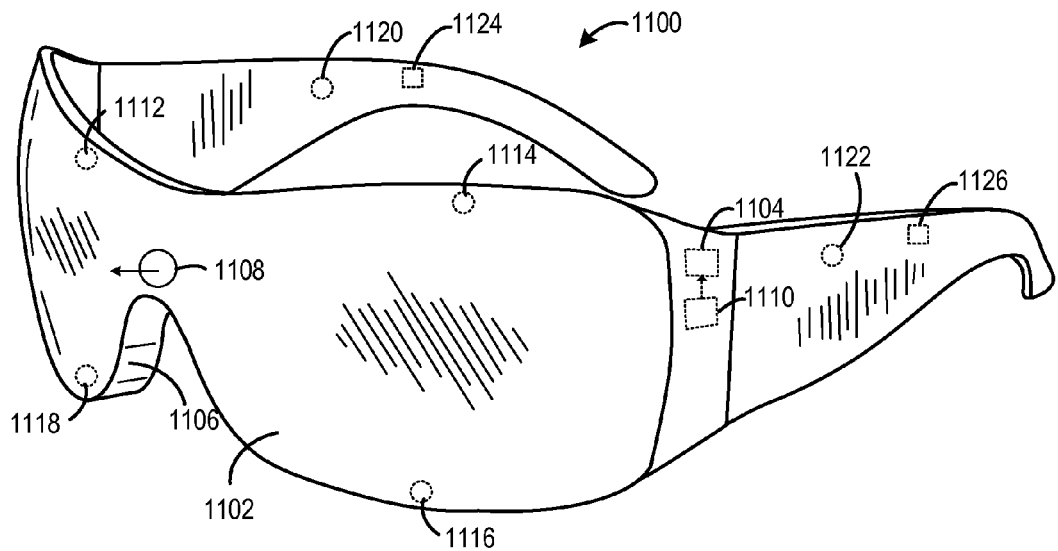
FIG. 11 shows an example HMD device.

The conversation detection implementations described herein may be used with any suitable computing device. For example, in some embodiments, the disclosed implementation may be implemented using an HMD device. FIG. 11 shows a non-limiting example of an HMD device 1100 in the form of a pair of wearable glasses with a transparent display 1102. It will be appreciated that an HMD device may take any other suitable form in which a transparent, semi-transparent, and/or non-transparent display is supported in front of a viewer's eye or eyes.

The HMD device 1100 includes a controller 1104 configured to control operation of the see-through display 1102. The see-through display 1102 may enable images such as holographic objects to be delivered to the eyes of a wearer of the HMD device 1100. The see-through display 1102 may be configured to visually augment an appearance of a real-world, physical environment to a wearer viewing the physical environment through the transparent display. For example, the appearance of the physical environment may be augmented by graphical content that is presented via the transparent display 1102 to create a mixed reality environment. In one example, the display may be configured to display one or more visual digital content items. In some cases, the digital content items may be virtual objects overlaid in front of the real-world environment. Likewise, in some cases, the digital content items may incorporate elements of real-world objects of the real-world environment seen through the transparent display 1102.

Any suitable mechanism may be used to display images via transparent display 1102. For example, transparent display 1102 may include image-producing elements located within lenses 1106 (such as, for example, a see-through Organic Light-Emitting Diode (OLED) display). As another example, the transparent display 1102 may include a light modulator located within a frame of HMD device 1100. In this example, the lenses 1106 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating a mixed reality environment. As noted above, embodiments of the present technology may operate without transparent display 1102, for example for suppressing digital content displayed on a display 604 (FIG. 6).

The HMD device 1100 may also include various sensors and related systems to provide information to the controller 1104. Such sensors may include, but are not limited to, a microphone array, one or more outward facing image sensors 1108, and an inertial measurement unit (IMU) 1110.

As a non-limiting example, the microphone array may include six microphones located on different portions of the HMD device 1100. In some implementations, microphones 1112 and 1114 may be positioned on a top portion of the lens 1106, and may be generally forward facing. Microphones 1112 and 1114 may be aimed at forty five degree angles relative to a forward direction of the HMD device 1100. Microphones 1112 and 1114 may be further aimed in a flat horizontal plane of the HMD device 1100. Microphones 1112 and 1114 may be omnidirectional microphones configured to capture sound in the general area/direction in front of the HMD device 1100, or may take any other suitable form.

Microphones 1116 and 1118 may be positioned on a bottom portion of the lens 1106. As one non-limiting example, microphones 1116 and 1118 may be forward facing and aimed downward to capture sound emitted from the wearer's mouth. In some implementations, microphones 1116 and 1118 may be directional microphones. In some implementations, microphones 1112, 1114, 1116, and 1118 may be positioned in a frame surrounding the lens 1106.

Microphones 1120 and 1122 each may be positioned on side frame of the HMD device 1100. Microphones 1120 and 1122 may be aimed at ninety degree angles relative to a forward direction of the HMD device 1100. Microphones 1120 and 1122 may be further aimed in a flat horizontal plane of the HMD device 1100. The microphones 1120 and 1122 may be omnidirectional microphones configured to capture sound in the general area/direction on each side of the HMD device 1100. It will be understood that any other suitable microphone array other than that described above also may be used.

As discussed above, the microphone array may produce an audio data stream that may be analyzed by controller 1104 to detect a conversation between a wearer of the HMD device and another person. In one non-limiting example, using digital signal processing, a root-mean-square perceived loudness from each microphone transducer may be calculated, and a weighted function may report if the microphones on the left or right are reporting a louder sound, and by how much. Similarly, a value may be reported for "towards mouth" and "away from mouth", and "Front vs side". This data may be used to determine a source location of human speech segments. Further, the controller 1104 may be configured to detect a conversation by determining that human speech segments alternate between different source locations.

It will be understood that the depicted microphone array is merely one non-limiting example of a suitable microphone array, and any suitable number of microphones in any suitable configuration may be implemented without departing from the scope of the present disclosure.

The one or more outward facing image sensors 1108 may be configured to capture visual data from the physical environment in which the HMD device 1100 is located. For example, the outward facing sensors 1108 may be configured to detect movements within a field of view of the display 1102, such as movements performed by a wearer or by a person or physical object within the field of view. In one example, the outward facing sensors 1108 may detect a user speaking to a wearer of the HMD device. The outward facing sensors may also capture 2D image information and depth information from the physical environment and physical objects within the environment. As discussed above, such image data may be used to visually recognize that a user is speaking to the wearer. Such analysis may be combined with the analysis of the audio data stream to increase a confidence of conversation detection.

The IMU 1110 may be configured to provide position and/or orientation data of the HMD device 1100 to the controller 1104. In one embodiment, the IMU 1110 may be configured as a three-axis or three-degree of freedom position sensor system. This example position sensor system may, for example, include three gyroscopes to indicate or measure a change in orientation of the HMD device 1100 within 3D space about three orthogonal axes (e.g., x, y, z) (e.g., roll, pitch, yaw). The orientation derived from the sensor signals of the IMU may be used to determine a direction of a user that has engaged the wearer of the HMD device in a conversation.

In another example, the IMU 1110 may be configured as a six-axis or six-degree of freedom position sensor system. Such a configuration may include three accelerometers and three gyroscopes to indicate or measure a change in location of the HMD device 1100 along the three orthogonal axes and a change in device orientation about the three orthogonal axes. In some embodiments, position and orientation data from the image sensor 1108 and the IMU 1110 may be used in conjunction to determine a position and orientation of the HMD device 100.

The HMD device 1100 may further include speakers 1124 and 1126 configured to output sound to the wearer of the HMD device. The speakers 1124 and 1126 may be positioned on each side frame portion of the HMD device proximate to the wearer's ears. For example, the speakers 1124 and 1126 may play audio content such as music, or a soundtrack to visual content displayed via the see-through display 1102. In some cases, a volume of the speakers may be lowered or muted in response to a conversation between the wearer and another person being detected.

The controller 1104 may include a logic machine and a storage machine, as discussed in more detail below with respect to FIG. 12 that may be in communication with the various sensors and display of the HMD device 1100. In one example, the storage machine may include instructions that are executable by the logic machine to receive an audio data stream from one or more sensors, such as the microphone array, detect a conversation between the wearer and a user based on the audio data stream, and modify presentation of a digital content item in response to detecting the conversation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
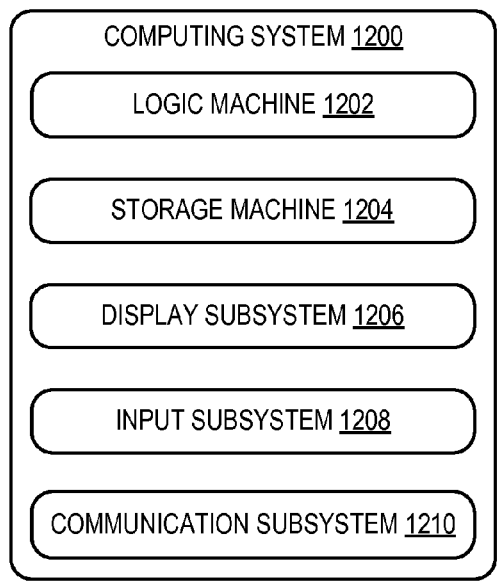
FIG. 12 shows an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices. For example, the computing system may take the form of the HMD device 104 shown in FIG. 1, the entertainment computing device 606 shown in FIG. 6, or another suitable computing device.

Computing system 1200 includes a logic machine 1202 and a storage machine 1204. Computing system 1200 may optionally include a display subsystem 106, input subsystem 1208, communication subsystem 1210, and/or other components not shown in FIG. 12.

Logic machine 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1204 includes one or more physical devices configured to hold instructions executable by the logic machine to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, the input subsystem 1208 may be configured to receive a sensor data stream from the sensor device 608 shown in FIG. 6.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted display device comprising:
one or more audio sensors configured to capture an audio data stream;
an optical sensor configured to capture an image data stream from a scene;
a see-through display configured to display a digital content item;
a logic machine; and
a storage machine holding instructions executable by the logic machine to receive the stream of audio data from the one or more audio sensors while the digital content item is being displayed via the see-through display,
receive the stream of image data from the optical sensor while the digital content item is being displayed via the see-through display,
detect at least one of a presence and identity of a person from at least one of the audio data stream captured by the one or more audio sensors and image data stream captured by the optical sensor, and
modify presentation of the digital content item via the see-through display in response to detecting at least one of the presence and identity of the person by at least one of the one or more audio sensors and the optical sensor, modification of the presentation comprising at least one of providing a cutout in the presentation around at least a portion of the person, pausing the content and repositioning the content elsewhere away from the detected person.

2. The head-mounted display device of claim 1, wherein the digital content item includes one or more of an audio content item and a video content item, and wherein the instructions are executable to modify presentation of the digital content item by providing a cutout entirely around the person, the cutout obscuring virtual content items otherwise overlapping with the person.

3. The head-mounted display device of claim 1, wherein the digital content item includes one or more of an audio content item and a video content item, and wherein the instructions are executable to modify presentation of the digital content item by providing a cutout around a head of the person, the cutout obscuring virtual content items otherwise overlapping with the person.

4. The head-mounted display device of claim 3, wherein the cutout moves with the person.

5. On a computing device, a method for detecting when to suppress digital content, the method comprising:
receiving at least one of an audio data stream and an image data stream from one or more sensors;
detecting a conversation between a first person receiving the digital content and a second person; and
modifying presentation of a digital content item when the conversation is detected, the modification of the presentation comprising suppressing a first portion of the content around at least a portion of the person while leaving a second portion of the content unaltered.

6. The method of claim 5, wherein detecting the conversation comprises:
detecting voice activity in the audio data stream, determining that the voice activity includes segments of human speech, and
determining that the segments of human speech alternate between different source locations.

7. The method of claim 6, wherein the one or more sensors include a microphone array comprising a plurality of microphones, and wherein determining a source location of a segment of human speech includes applying a beam-forming spatial filter to a plurality of audio samples of the microphone array to estimate the different source locations.

8. The method of claim 5, wherein the digital content item includes one or more of an audio content item and a video content item, and wherein modifying presentation of the digital content item further includes pausing presentation of the audio content item or the video content item.

9. The method of claim 5, wherein the digital content item includes an audio content item, and wherein modifying presentation of the digital content item further includes lowering a volume of the audio content item.

10. The method of claim 5, wherein the digital content item further includes one or more visual content items, and wherein modifying presentation of the digital content item includes one or more of hiding the one or more visual content items from view on a display, moving the one or more visual content items to a different position on the display, changing a translucency of the one or more visual content items, and changing a size of the one or more visual content items on the display.

* * * * *